(12) United States Patent
Maeng et al.

(10) Patent No.: US 8,343,641 B2
(45) Date of Patent: Jan. 1, 2013

(54) ELECTRODE ASSEMBLY AND SECONDARY BATTERY HAVING THE SAME

(75) Inventors: Sooyeon Maeng, Yongin-si (KR); Jinha Jun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 822 days.

(21) Appl. No.: 12/467,037

(22) Filed: May 15, 2009

(65) Prior Publication Data
US 2009/0317714 A1 Dec. 24, 2009

(30) Foreign Application Priority Data
Jun. 20, 2008 (KR) ........................ 10-2008-0058339

(51) Int. Cl.
*H01M 10/0587* (2010.01)
(52) U.S. Cl. ............................................ 429/61; 429/94
(58) Field of Classification Search .................. 429/61, 429/94
See application file for complete search history.

(56) References Cited

U.S. PATENT DOCUMENTS

2004/0197639 A1* 10/2004 Honda et al. .................... 429/94
2005/0188533 A1* 9/2005 Righi et al. .................. 429/94 X
2005/0287431 A1 12/2005 Cho
2007/0166605 A1* 7/2007 Meguro et al. .................. 429/61

FOREIGN PATENT DOCUMENTS

| JP | 2002-198102 | 7/2002 |
| KR | 10-2005-0121906 | 12/2005 |
| KR | 10-2006-0086022 | 7/2006 |

OTHER PUBLICATIONS

Computer-generated English translation of JP 2002-198102 (Inagaki et al.), from the Japanese Patent Office website (doc date Jul. 2002).*

* cited by examiner

*Primary Examiner* — Stephen J. Kalafut
(74) *Attorney, Agent, or Firm* — Christie, Parker & Hale, LLP

(57) ABSTRACT

A secondary battery includes an electrode assembly having a first electrode plate, second electrode plate and separator between the first electrode plate and the second electrode plate wound such that the separator defines an inner circumference of the electrode assembly. A can is provided for receiving the electrode assembly through a can opening and a cap assembly is provided for covering the can opening. An electrically conductive plate is on the inner circumference of the electrode assembly.

18 Claims, 7 Drawing Sheets

ELECTRODE ASSEMBLY AND SECONDARY BATTERY HAVING THE SAME

CROSS-REFERENCE TO RELATED APPLICATION

This application claims priority to and the benefit of Korean Patent Application No. 10-2008-0058339 filed on 20 Jun. 2008 in the Korean Intellectual Property Office (KIPO), the entire content of which is hereby incorporated by reference.

BACKGROUND OF THE INVENTION

1. Field of the Invention

The present invention relates to a battery, and more particularly, to an electrode assembly and a secondary battery having the same.

2. Description of the Prior Art

Generally, a lithium secondary battery includes a cathode plate, an anode plate and a separator, and can be reused by repeatedly charging/discharging the battery.

Safety tests including penetration, compression and oven tests are performed on the lithium secondary battery to prevent accidents caused by damage to the secondary battery that may occur during use.

Particularly, the lithium secondary battery may cease functioning as a battery, or may catch fire and/or explode when it is compressed and damaged by external impact. Such accidents are caused by a short circuit that occurs between cathode and anode collectors, and cathode and anode coated portions. Accordingly, research and development has been actively performed to prevent dangers such as fire or explosion when the secondary battery is compressed and damaged by external impact.

SUMMARY OF THE INVENTION

Embodiments of the present invention provide an electrode assembly and a secondary battery having the same that can improve safety and reliability by preventing or significantly reducing the risk of fire and explosion when the secondary battery is compressed and/or damaged by external impact.

Further, embodiments of the present invention provide an electrode assembly and a lithium secondary battery using the same that can prevent or significantly reduce an internal short circuit caused by contact between a uncoated portion of a first electrode plate and a coated portion of a second electrode plate when a separator is compressed.

According to one aspect of the present invention, a secondary battery is provided that includes an electrode assembly having a first electrode plate, second electrode plate and separator between the first electrode plate and the second electrode plate wound such that the separator defines an inner circumference of the electrode assembly. A can is provided for receiving the electrode assembly through a can opening and a cap assembly is provided for covering the can opening. An electrically conductive plate is on the inner circumference of the electrode assembly.

In embodiments, the electrically conductive plate may comprise metal, such as nickel. Further, a thickness (T) of the electrically conductive plate may be from about 0.1 to 0.2 mm. The electrically conductive plate may substantially square, rectangular, or circular, and at least one side of the electrically conductive plate may be serrated.

A height of the electrically conductive plate may be greater than or equal to 1.0 mm and may be less than or equal to half of a height of the electrode assembly. Further, a distance between a side of the electrically conductive plate and an adjacent inner circumference of the electrode assembly may be from about 1.0 to 3.5 mm. In one embodiment, the electrically conductive plate is welded to or integral with one of the first electrode tab and the second electrode tab.

BRIEF DESCRIPTION OF THE DRAWINGS

The above and other objects, features and advantages of the present invention will be more apparent from the following detailed description in conjunction with the accompanying drawings, in which.

DETAILED DESCRIPTION

Figure 1:
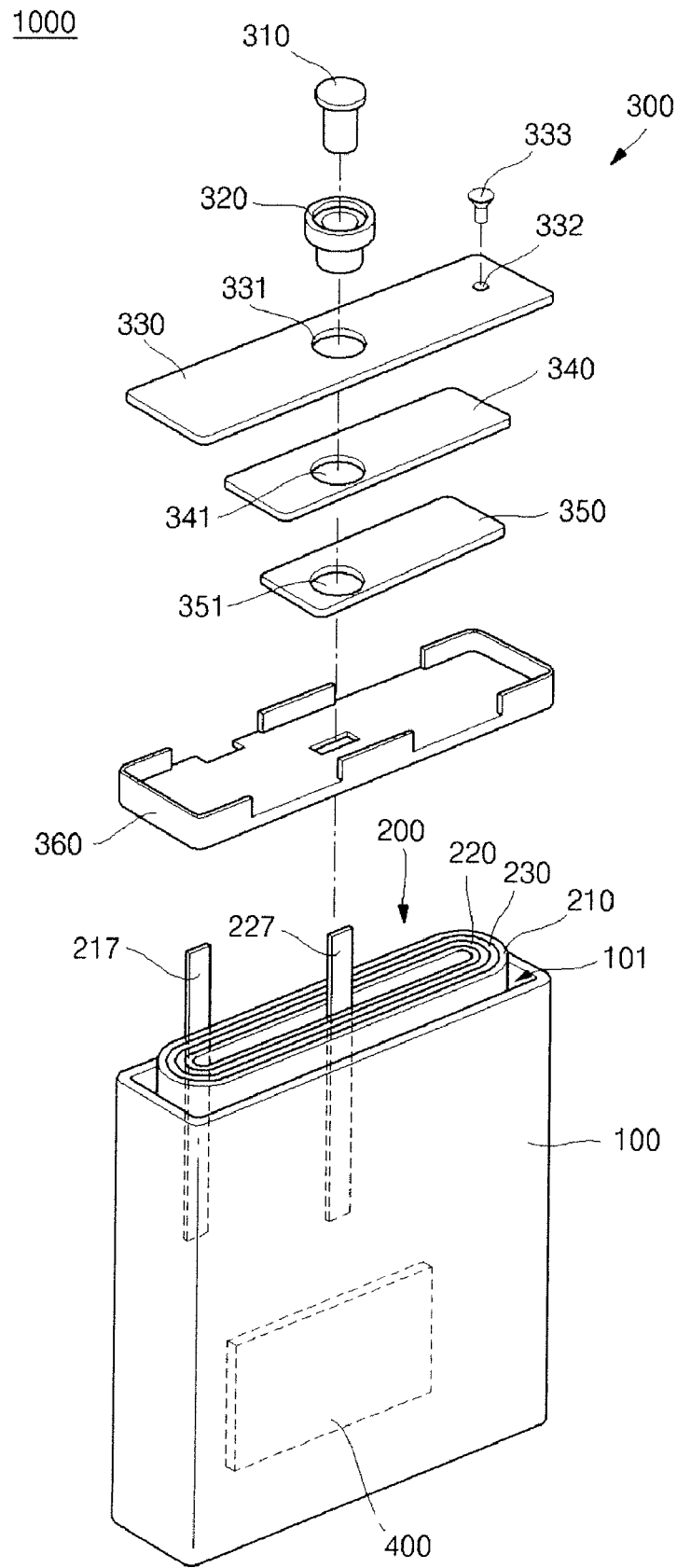
FIG. 1 is a perspective view illustrating a secondary battery according to one exemplary embodiment of the present invention.

Hereinafter, embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but rather can be implemented in diverse forms. The matters defined in the description, such as the detailed construction and elements, are simply specific details provided to assist those of ordinary skill in the art in a comprehensive understanding of the invention, and the present invention is defined within the scope of the appended claims. The same drawing reference numerals are used for the same elements across various figures throughout the entire description of the present invention.

An electrode assembly 200 and a secondary battery 1000 having the same according to various embodiments of the present invention will be explained in detail below. The secondary battery 1000 may be a lithium secondary battery, but not limited thereto.

Figure 2:
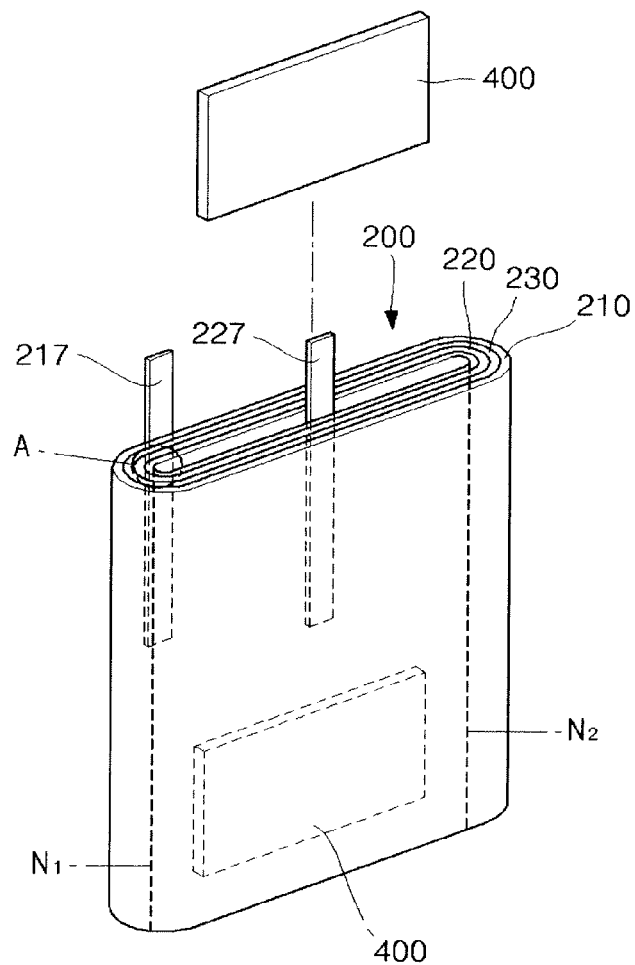
FIG. 2 is a perspective view illustrating an electrode assembly according to one exemplary embodiment of the present invention.
Figure 3:
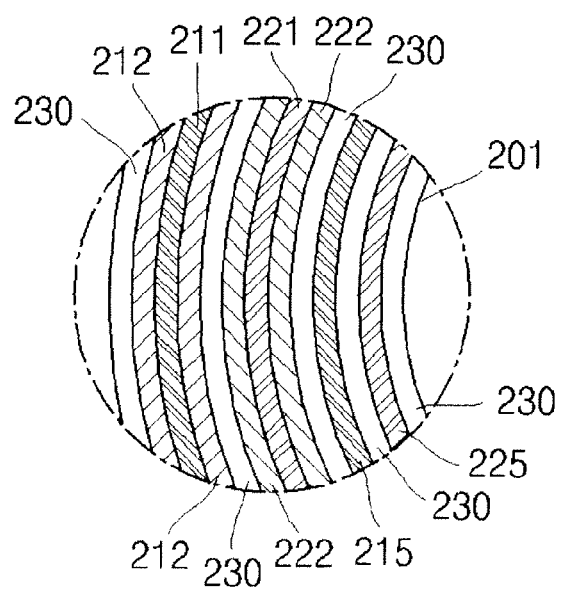
FIG. 3 is a detail view illustrating region 'A' of the electrode assembly of FIG. 2.

FIG. 1 is a perspective view illustrating a secondary battery according to one exemplary embodiment of the present invention, FIG. 2 is a perspective view illustrating an electrode assembly according to one embodiment of the present invention, and FIG. 3 is a detailed view illustrating region 'A' of the electrode assembly of FIG. 2.

The embodiments applied in a rectangular secondary battery 1000 will be explained, but not limited thereto. The present invention can be also applied in a cylindrical or pouch type secondary battery.

Referring to FIGS. 1 to 3, the secondary battery 1000 includes a can 100, an electrode assembly 200 received in the can 100, a cap assembly 300 covering an upper opening 101 of the can 100, and an electrically conductive plate 400.

A bare cell is formed by combining the can 100, electrode assembly 200 and cap assembly 300 to each other. The electrode assembly 200 includes an electrically conductive plate 400 that can exhaust most energy of the secondary battery 1000 by a short circuit when the bare cell is compressed by external pressure, as described in more detail below.

The can 100 has a generally rectangular shape and may include an opening 101. The can 100 may be made of metal and can itself function as a terminal. An electrode assembly 200 may be inserted into the can 100 through the upper opening 101.

The electrode assembly 200 includes first and second electrode plates 210, 220 and a separator 230. The electrode assembly 200 may be formed by interposing the separator 230 between the first and second electrode plates 210, 220 and winding them in a jelly-roll type.

The first electrode plate 210 includes a first electrode collector 211 and a first electrode coated portion 212.

The first electrode collector 211 may be made of aluminum (Al) foil having excellent conductivity when the first electrode plate 210 is a cathode.

The first electrode coated portion 212 is provided on the first electrode collector 211 and formed of a first electrode active material, conductive material and binder. The first electrode active material may be lithium cobalt oxide ($LiCoO_2$), lithium manganese oxide ($LiMn_2O_4$) or lithium nickel oxide ($LiNiO_2$). The conductive material may be carbon black. The binder may be polyvinylidene fluoride (PVDF), styrene-butadiene (SBR) or poly(tetrafluoroethylene) (PTFE) dissolved and dispersed in a volatile solvent such as N-Methyl-2-pyrrolidone (NMP), an organic solvent, or water.

Both ends of the first electrode collector 211 are provided with a first electrode uncoated portion 215 absent the first electrode active material. A first electrode tab 217 is attached to the first electrode uncoated portion 215 and extends toward the upper opening 101 of the can 100. The first electrode tab 217 may be made of aluminum. A first insulation tape (not shown) may be formed at a part of the first electrode tab 217 extending from the electrode assembly 200 to prevent a short circuit with parts other than the can 100.

The second electrode plate 220 includes a second electrode collector 221 and a second electrode coated portion 222.

The second electrode collector 221 is made of copper (Cu) foil having excellent conductivity when the second electrode plate 220 is an anode.

The second electrode coated portion 222 is provided on the second electrode collector 221 and formed of a second electrode active material, conductive material and binder. The second electrode active material may be carbon (C) material, silicone, tin, tin oxide, composite tin alloy, transition metal oxide, lithium metal nitride or lithium metal oxide. Typically, carbonic material may be used as the second electrode active material. The conductive material may be carbon black. The binder may be PVDF, SBR or PTFE dissolved and dispersed in a volatile solvent such as NMP, an organic solvent or water. The conductive material may be omitted from the second electrode plate 220 because conductivity of the second electrode active material itself is high.

Both ends of the second electrode collector 221 are provided with a second electrode uncoated portion 225 absent the second electrode active material. A second electrode tab 227 is attached to the second electrode uncoated portion 225 and extends toward the upper opening 101 of the can 100. The second electrode tab 227 may be made of copper (Cu) or nickel (Ni). A second insulation tape (not shown) may be formed at a part of the second electrode tab 227 extending from the electrode assembly 200 to prevent a short circuit with other parts of the secondary battery.

In the above description, the first electrode plate 210 is a cathode and the second electrode plate 220 is an anode. However, it will be understood that the first electrode plate 210 may be an anode and the second electrode plate 220 may be a cathode and that the materials of the collectors and coated portions may be reversed accordingly.

Typically, the can 100 functioning as a terminal in the rectangular secondary battery 1000 is a cathode. When the first electrode plate 210 is a cathode, the outermost or peripheral electrode plate of the jelly-roll electrode assembly 200 that is a cathode may be the first electrode plate 210. In addition, when the first electrode plate 210 is an anode, the outermost or peripheral electrode plate of the jelly-roll electrode assembly 200 that is a cathode may be the second electrode plate 220.

One exemplary embodiment will be explained below where the first electrode plate 210 is a cathode and the second electrode plate 220 is an anode.

A separator 230 may be a porous film made of polyethylene (PE), polypropylene (PP) or composite film thereof. The separator 230 interrupts electron conductivity between the first and second electrode plates 210, 220 in the electrode assembly 200 and allows lithium ions to move smoothly. The separator 230 prevents contact between the first and second electrode plates 210, 220 and also prevents temperature increase through shut-down, etc. when the temperature of the secondary battery 1000 is increased by an external short circuit.

In addition to the separator 230, a ceramic layer formed by ceramic material with the binder may be further formed on one or both surfaces of the first and second electrode plates 210, 220 to prevent a short between the first and second electrode plates 210, 220, but detailed explanation will be omitted.

In the electrode assembly 200, lithium ions move from the first electrode plate 210 to the second electrode plate 220 at the time of charging and are intercalated thereto. At the time of discharging, lithium ions are deintercalated from the second electrode plate 220 to the first electrode plate 210, thereby allowing voltage to an external power supply.

The cap assembly 300 includes an electrode terminal 310, a gasket 320, a cap plate 330, an insulation plate 340 and a terminal plate 350. The cap assembly 300 is combined to the electrode assembly 200 at the opening 101 of the can 100 with an additional insulation case 360, thereby sealing the can 100.

A terminal hole 331 may be formed in the middle of the cap plate 330. An electrolyte injection hole 332 may be formed at one side of the cap plate 330. A safety vent (not shown) is formed at one surface of the cap plate 330 that corresponds to the electrolyte injection hole 332 about the terminal hole 331. The electrolyte injection hole 332 is sealed by a cover or plug 333 such as a ball after electrolyte is injected into the can 100. The cap plate 330 is formed of a metal plate having a size corresponding to the upper opening 101 of the can 100.

The electrode terminal 310 is inserted into the terminal hole 331 of the cap plate. The electrode terminal 310 may be an anode terminal.

When the electrode terminal 310 is inserted into the terminal hole 331 of the cap plate 330, the gasket 320 is interposed between the electrode terminal 310 and terminal hole 331 to insulate the electrode terminal 310 and cap plate 330.

The insulation plate 340 is combined to a lower surface of the cap plate 330 and made of insulating material such as that used for the gasket 320.

The terminal plate 350 is combined to a lower surface of the insulation plate 340 and made of a metal such as nickel alloy.

Terminal holes 341, 351 similar to the terminal hole 331 are formed at positions of the insulation plate 340 and terminal plate 350 that correspond to the terminal hole 331 of the cap plate 330.

The electrode terminal 310 is inserted into terminal holes of the cap plate 330, insulation plate 340 and terminal plate 350 to be electrically coupled to the second electrode tab 227 of the electrode assembly 200. The first electrode tab 217 is electrically coupled to a side of the cap plate 330 corresponding to the first electrode tab 217.

The electrically conductive plate 400 is provided at an inner circumference 201 of the electrode assembly 200 having a jelly-roll shape (i.e., in the center of the rolled electrode assembly), and may be between a bottom surface and an electrode tab of the electrode assembly 200, as shown in FIG. 2.

The inner circumference 201 is defined as the innermost winding of the wound jelly-roll electrode assembly 200.

The inner circumference 201 forming the innermost part of the electrode assembly 200 may be formed by the separator 230.

With reference to FIG. 3, the electrode assembly 200 may be formed by sequentially stacking the separator 230, the second electrode uncoated portion 225, the separator 230, the first electrode uncoated portion 215, the separator 230, the second electrode coated portion 222, the second electrode collector 221, the second electrode coated portion 222, the separator 230, the first electrode coated portion 212, the first electrode collector 211, the first electrode coated portion 212, the separator 230 and the second electrode coated portion 222 in that order such that the separator 230 forms the inner circumference 201.

A structure, materials and functions of the electrically conductive plate 400 will be explained in detail below.

Figure 4:
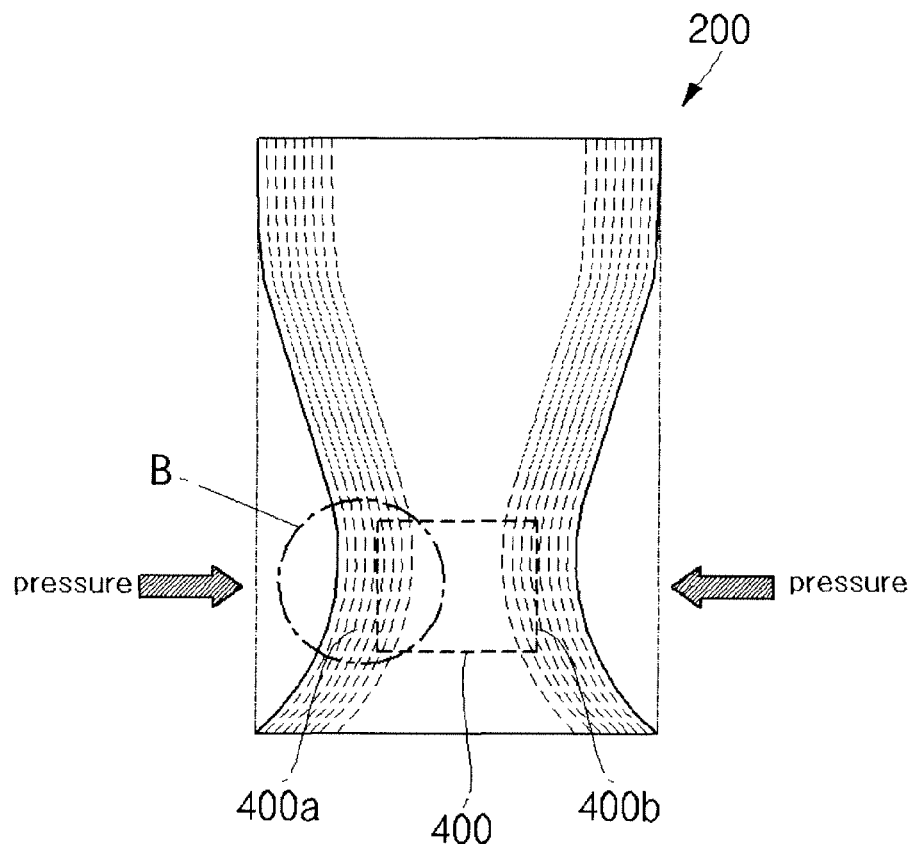
FIG. 4 is a view illustrating the effect on an electrically conductive plate in response to external pressure applied to the electrode assembly.
Figure 5:
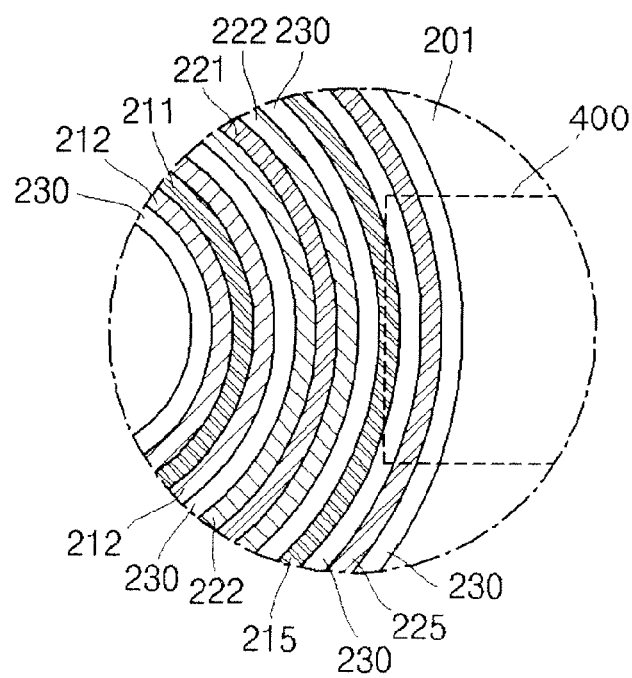
FIG. 5 is a magnified view illustrating region 'B' of the electrode assembly of FIG. 4.

Referring to FIGS. 4 and 5, the secondary battery 1000 may cease to function or may catch fire or explode if the battery is compressed or damaged by a vertical compression test or external impact causing a short circuit to occur between the first and second electrode collectors 211, 221 and first and second electrode coated portions 212, 222 inside the battery when the battery is compressed. Particularly, the possibility of fire and explosion is high when a short circuit occurs between the first electrode coated portion 212 and second electrode collector 221.

When compression force is applied to the electrode assembly as shown in FIGS. 4 and 5, the electrically conductive plate 400 in the electrode assembly 200 first passes through and/or pierces the second electrode collector 221 and first electrode collector 211. More particularly, the electrically conductive plate 400 first passes through the second electrode uncoated portion 225 and through the first electrode uncoated portion 215.

In other words, when the secondary battery 1000 is impacted by a horizontal compression force or by any force that compresses the electrode assembly generally from a side toward the center of the electrode assembly, the electrically conductive plate 400 first passes through the first electrode uncoated portion 215 of only the first electrode collector 211 and the second electrode uncoated portion 225 of only the second electrode collector 221. Thus, the first and second electrode uncoated portions 215 and 225 may be short circuited first. Accordingly, most of electric energy of the electrode assembly 200 is exhausted by the first and second electrode uncoated portions 215, 225 being pierced.

As described above, the first and second electrode uncoated portions 215, 225 are short circuited before a short circuit occurs between the first electrode coated portion 212 and second electrode collector 221. Thus, the possibility of fire and explosion can be significantly reduced.

The horizontal compression force is shown to be applied to a certain portion of the electrode assembly 200 in FIG. 4. However, the horizontal compression force can be uniformly applied to the entire electrode assembly 200 about inner circumference lines N1 and N2 thereof (FIG. 2).

Figure 6:
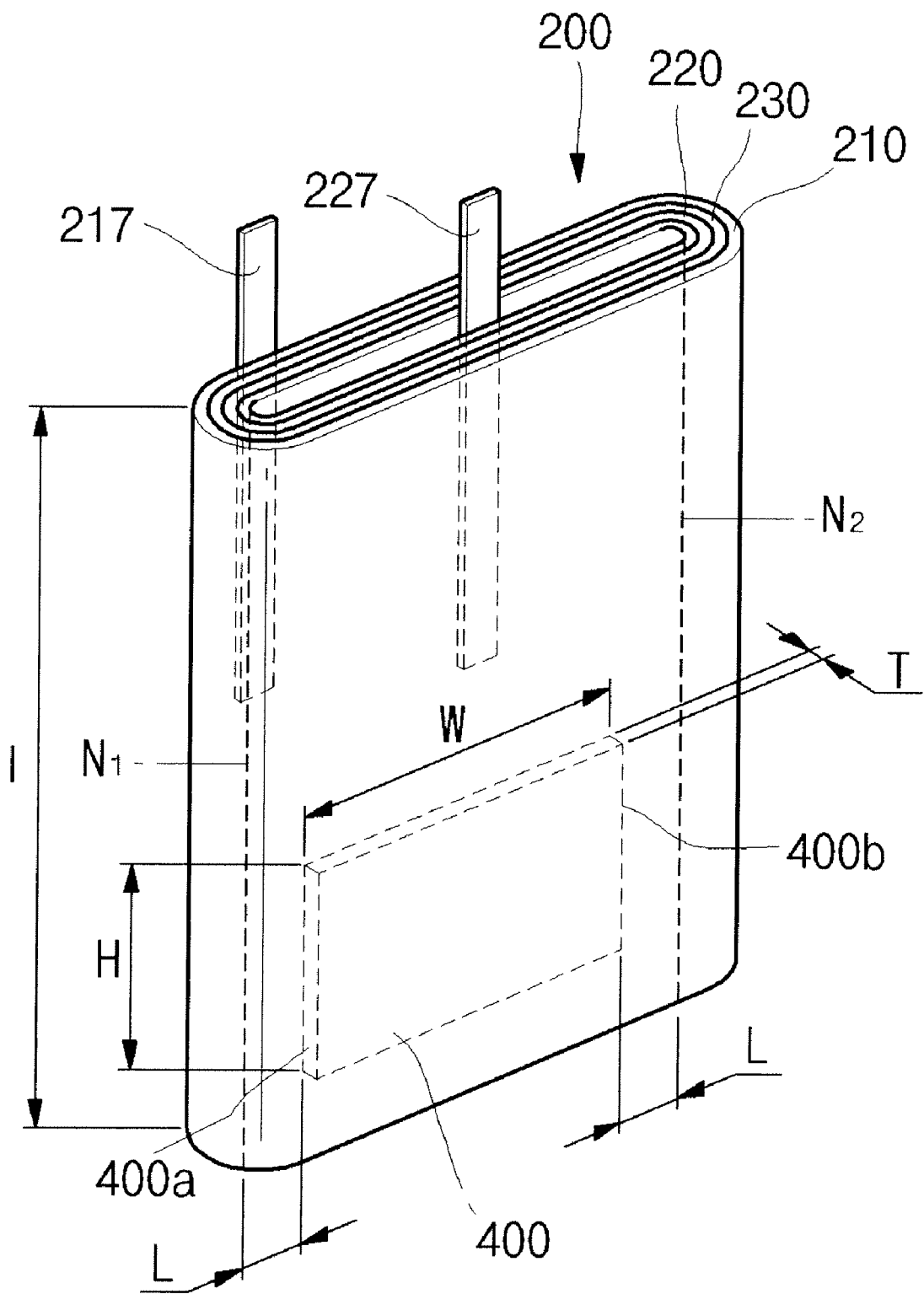
FIG. 6 is a perspective view illustrating an electrode assembly according to another embodiment of the present invention.

FIG. 6 is a perspective view illustrating an electrode assembly according to another embodiment of the present invention.

Referring to FIG. 6, the electrically conductive plate 400 has a polygonal shape, for example, a square shape or a rectangular shape.

A thickness (T) of the electrically conductive plate 400 may be from about 0.1 to 0.2 mm. If the thickness (T) of the electrically conductive plate 400 is less than 0.1 mm, the electrically conductive plate 400 may be bent in a direction perpendicular to the direction of the force rather than pierce through the electrode assembly 200 to short circuit the first and second electrode uncoated portions when the secondary battery 1000, and particularly the electrode assembly 200, is compressed. If the thickness (T) of the electrically conductive plate 400 is more than 0.2 mm, the electrode assembly 200 may be partially swelled to cause change of the shape thereof.

A height (H) of the electrically conductive plate 400 may be greater than or equal to 1 mm and less than or equal to half of a height (I) of the electrode assembly 200. If the height (H) of the electrically conductive plate 400 is less than 1 mm, the electrically conductive plate 400 may be bent in a direction perpendicular to the direction of the force rather than pierce the electrode assembly 200 to short circuit the first and second electrode uncoated portions 215, 225 when the secondary battery 1000, and particularly the electrode assembly 200, is vertically compressed. On the other hand, when the height (H) of the electrically conductive plate 400 is greater than half of the height (I) of the electrode assembly 200, the electrically conductive plate 400 may partially overlap the second electrode tab 227. Thus, the electrode assembly 200 may be partially swelled to cause change of the shape thereof.

A distance between sides 400a, 400b of the electrically conductive plate 400 and the adjacent inner circumference N1, N2, respectively, of the electrode assembly 200, noted as distance (L), may be between about 1 to 3.5 mm, where the sides 400a, 400b are a reference of a width (W) of the electrically conductive plate 400. When the distance (L) is less than 1 mm, the electrically conductive plate 400 and electrode assembly 200 may be short circuited by very minor compression force. As a result, the secondary battery 1000 may cease to function upon very little impact. When the distance (L) is more than 3.5 mm, the electrode assembly 200 may be internally deformed before the electrically conductive plate 400 is short circuited with the first and second electrode uncoated portions by the compression force. As a result, a short circuit may occur between the collectors and coated portions and cause fire or explosion of the secondary battery.

The electrically conductive plate 400 may be made of metal, for example, nickel (Ni).

FIGS. 7 to 10 are perspective views illustrating electrically conductive plates according to other embodiments of the present invention.

Figure 7:
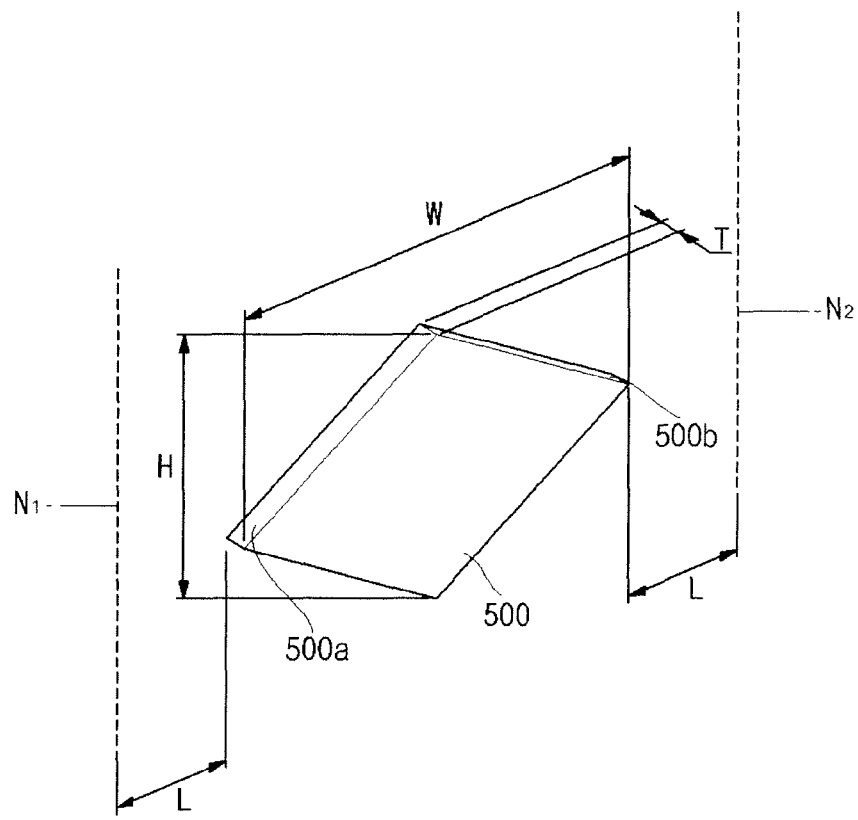
FIGS. 7 to 10 are perspective views illustrating electrically conductive plates according to other embodiments of the present invention.

Referring to FIG. 7, the electrically conductive plate 500 has a lozenge or diamond shape.

The electrically conductive plate 500 is configured such that sharp and pointed edges face the inner circumference 201 of the electrode assembly 200. Accordingly, the electrically conductive plate 500 can easily pass through first and second electrode collectors when a secondary battery 1000, and particularly an electrode assembly 200, is compressed by a horizontal force. As a result, it is possible to cause a short circuit between the electrically conductive plate 500 and first and second electrode collectors before a short circuit occurs between collectors and coated portions of the electrode assembly 200. More particularly, electrical energy can be exhausted by first causing the short circuit between the electrically conductive plate 500 and the first and second electrode uncoated portions.

A thickness (T) and height (H) of the electrically conductive plate 500 shown in FIG. 7, and a distance (L) between the sides 500a, 500b of the electrically conductive plate 500 and the inner circumference lines N1, N2 of the inner circumference 201 are the same as embodiment of FIG. 6. Accordingly, explanation about them will be omitted.

Figure 8:
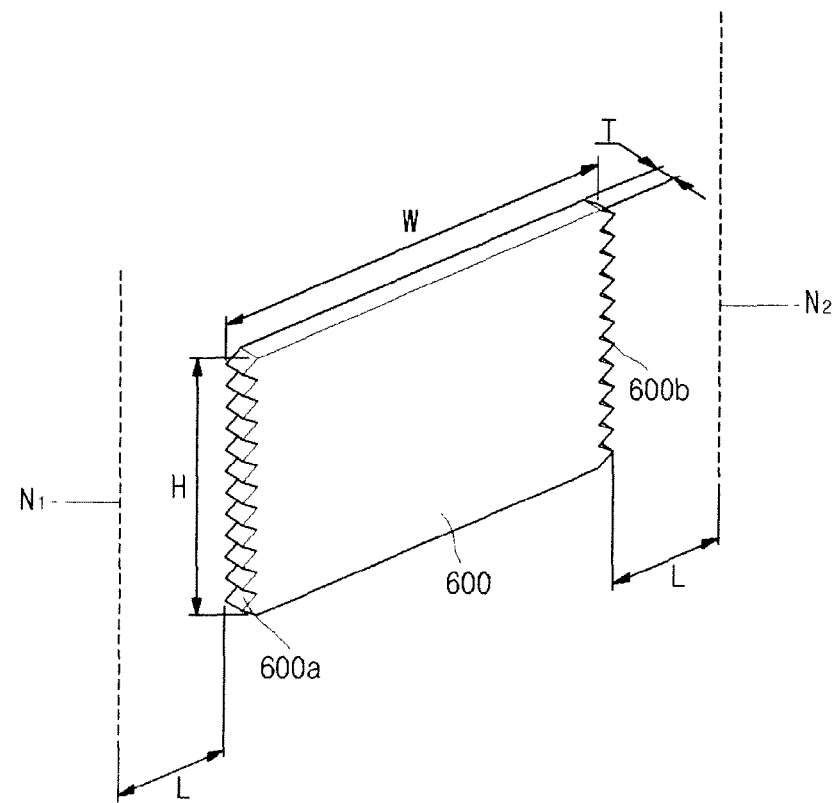

Referring to FIG. 8, the electrically conductive plate 600 has a rectangular shape with two sides 600a, 600b being serrated. Accordingly, the electrically conductive plate 600 can easily pass through first and second electrode collectors when a secondary battery 1000, and particularly an electrode assembly 200, is compressed by a horizontal force. As a result, it is possible to cause a short circuit between the electrically conductive plate 600 and first and second electrode collectors before a short circuit occurs between collectors and coated portions of the electrode assembly 200 by the compression force. More particularly, electrical energy can be exhausted by first causing the short between the electrically conductive plate 600 and the first and second electrode uncoated portions.

A thickness (T) and height (H) of the electrically conductive plate 600 shown in FIG. 8, and a distance (L) between the sides 600a, 600b of the electrically conductive plate 600 and the inner circumference lines N1, N2 of the inner circumference 201 are the same as embodiment of FIG. 6. Accordingly, explanation about them will be omitted.

Figure 9:
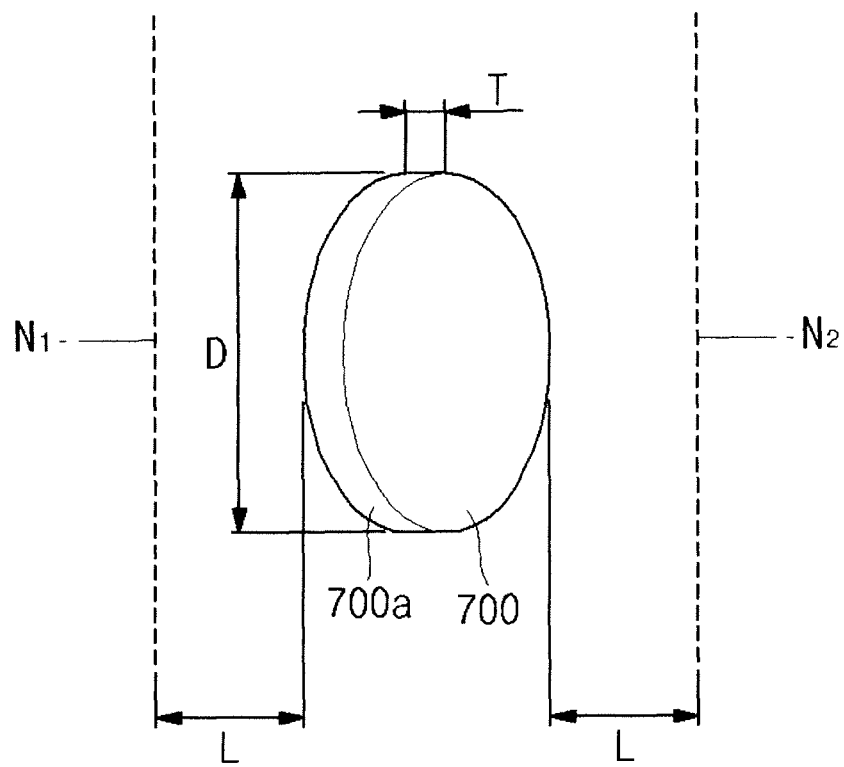

Referring to FIG. 9, an electrically conductive plate 700 has a circular shape.

A diameter (D) of the circular electrically conductive plate 700 is about the same as the width (W) or height (H) of the electrically conductive plate 400 of FIG. 6. In addition, an outer circumference 700a of the electrically conductive plate 700 generally corresponds to the side 400a of the electrically conductive plate 400 of FIG. 6.

A thickness (T) and diameter (D) of the electrically conductive plate 700, and a distance (L) between the outer circumference 700a of the electrically conductive plate 700 and the inner circumference line N1, N2 of the inner circumference 201 are the same as embodiment of FIG. 6. Accordingly, explanation about them will be omitted.

Figure 10:
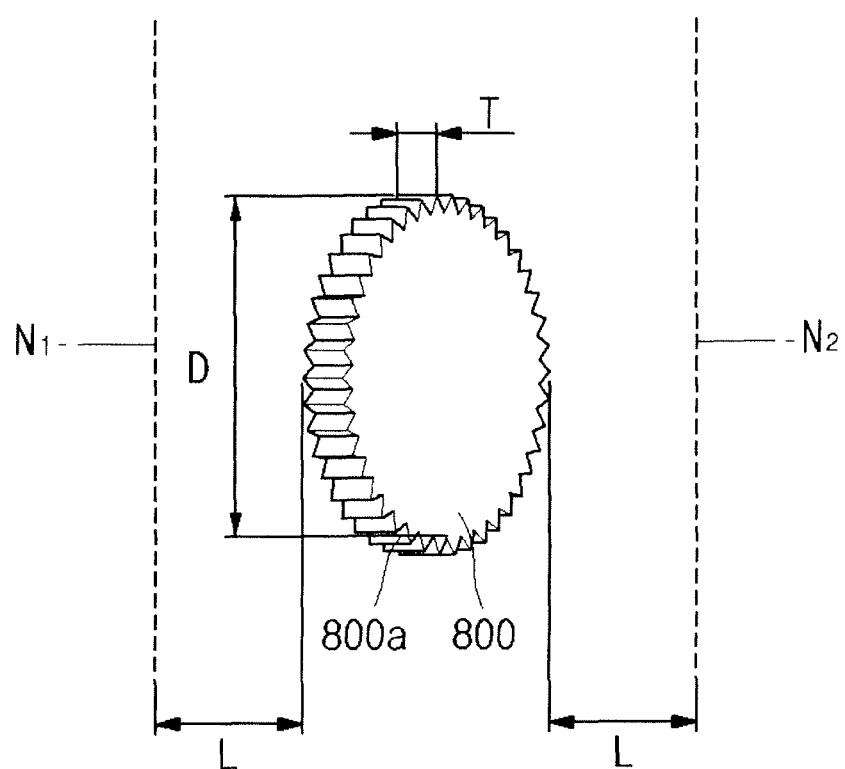

Referring to FIG. 10, an electrically conductive plate 800 has a circular shape with a serrated outer circumference 800a. The entire outer circumference 800a of the electrically conductive plate 800 may be serrated, or only a portion contacting the inner circumference 201 of the electrode assembly 200 may be serrated.

Due to the serrated edge 800a, the electrically conductive plate 800 can easily pass through first and second electrode collectors when a secondary battery 1000, and particularly an electrode assembly 200, is compressed by a horizontal force. As a result, it is possible to cause a short circuit between the electrically conductive plate 800 and first and second electrode collectors before a short occurs between collectors and coated portions of the electrode assembly 200 by the compression force. More particularly, electrical energy can be exhausted by first causing a short between the electrically conductive plate 800 and the first and second electrode uncoated portions.

A thickness (T) and diameter (D) of the electrically conductive plate 800 shown in FIG. 10, and a distance (L) between the outer circumference 800a of the electrically conductive plate 800 and the inner circumference lines N1, N2 of the inner circumference 201 are the same as embodiment of FIG. 6. Accordingly, explanation about them will be omitted.

Figure 11:
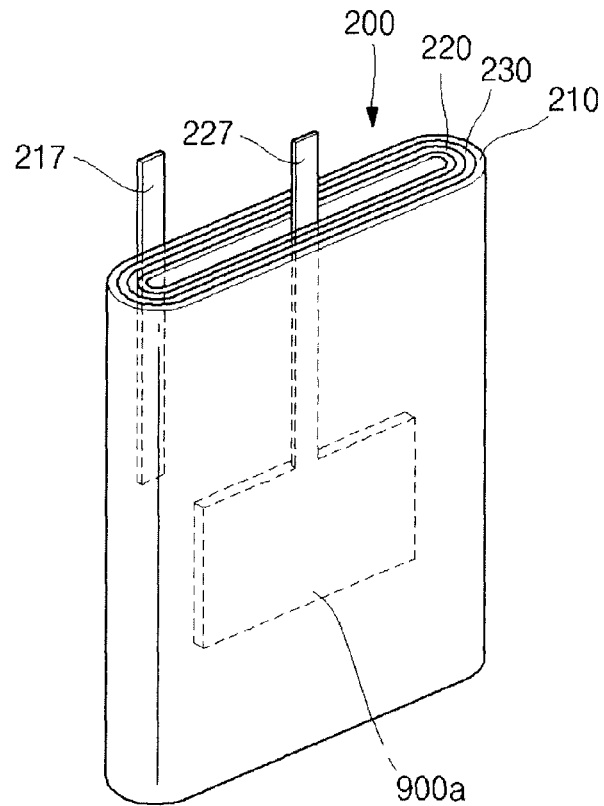
FIGS. 11 and 12 are perspective views illustrating electrode assemblies according to other embodiments of the present invention.
Figure 12:
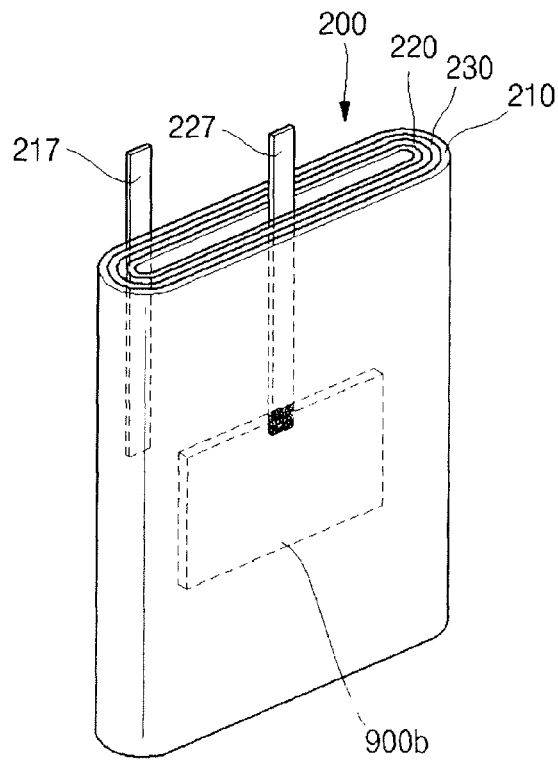

FIGS. 11 and 12 are perspective views illustrating electrode assemblies according to other exemplary embodiments of the present invention.

Referring to FIGS. 11 and 12, electrically conductive plates 900a, 900b are electrically coupled to a second electrode tab 227. The electrically conductive plate 900a is interposed between a separator 230 and a second electrode uncoated portion 225. The electrically conductive plate 900a may be formed integrally with the second electrode tab 227. In addition, the electrically conductive plate 900b may be welded to the second electrode tab 227.

Structures, materials and locations of the electrically conductive plates 900 and 900b have been described above and thus explanation about them will be omitted.

As described above, the electrode assembly including the electrically conductive plate and lithium secondary battery comprising the same according to the present invention produce the following effect.

The electrically conductive plate can exhaust most energy of the secondary battery by short circuiting the first and second electrode collectors first when the electrode assembly is horizontally compressed by external impact. Thus, the electrically conductive plate can improve safety and reliability by preventing fire and explosions when it is compressed or damaged by external impact.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A secondary battery, comprising:
   an electrode assembly comprising a first electrode plate and a first electrode tab attached to the first electrode plate, a second electrode plate and a separator between the first electrode plate and the second electrode plate wound such that the separator defines an inner circumference of the electrode assembly;
   a can for receiving the electrode assembly through a can opening;
   a cap assembly for covering the can opening; and
   an electrically conductive plate within the inner circumference of the electrode assembly, wherein the electrically conductive plate contacts the first electrode tab.

2. The secondary battery of claim 1, wherein the electrically conductive plate comprises metal.

3. The secondary battery of claim 2, wherein the electrically conductive plate comprises nickel.

4. The secondary battery of claim 1, wherein a thickness of the electrically conductive plate is from about 0.1 to 0.2 mm.

5. The secondary battery of claim 1, wherein the electrically conductive plate is substantially square.

6. The secondary battery of claim 1, wherein the electrically conductive plate is a substantially rectangular shape or a substantially lozenge shape.

7. The secondary battery of claim 6, wherein at least one side of the electrically conductive plate is serrated.

8. The secondary battery of claim 6, wherein a height of the electrically conductive plate is greater than or equal to 1.0 mm and is less than or equal to half of a height of the electrode assembly.

9. The secondary battery of claim 6, wherein a distance between a side of the electrically conductive plate and an adjacent inner circumference of the electrode assembly is from about 1.0 to about 3.5 mm.

10. The secondary battery of claim 1, wherein the electrically conductive plate is circular.

11. The secondary battery of claim 10, wherein an outer circumference of the electrically conductive plate is serrated.

12. The secondary battery of claim 10, wherein a diameter of the electrically conductive plate is 1.0 mm or greater and is less than or equal to half of a height of the electrode assembly.

13. The secondary battery of claim 10, wherein a distance between an outer circumference of the electrically conductive plate and an adjacent inner circumference of the electrode assembly is from about 1.0 to about 3.5 mm.

14. The secondary battery of claim 1, wherein the electrode assembly comprises:
a first electrode uncoated portion on the first electrode plate to which the first electrode tab is attached; and
a second electrode uncoated portion on the second electrode plate and a second electrode tab attached to the second electrode uncoated portion,
wherein the electrically conductive plate is fixedly connected at the inner circumference of the electrode assembly to one of the first electrode tab and the second electrode tab.

15. The secondary battery of claim 1, wherein
the first electrode plate comprises a first electrode collector, a first electrode coated portion and a first electrode uncoated portion, and
the second electrode plate comprises a second electrode collector, a second electrode coated portion and a second electrode uncoated portion,
wherein a wound configuration of the electrode assembly sequentially includes, from an inner circumference outward, the separator, the second electrode uncoated portion, the separator, the first electrode uncoated portion, the separator, the second electrode coated portion, the second electrode collector, the second electrode coated portion, the separator, the first electrode coated portion, the first electrode collector, the first electrode coated portion, the separator and the second electrode coated portion.

16. An electrode assembly, comprising:
a first electrode plate;
a second electrode plate;
a first electrode tab attached to the first electrode plate;
a separator between the first electrode plate and the second electrode plate, wherein the electrode assembly is wound such that the first electrode plate, the second electrode plate and separator form a jelly-roll configuration and the separator establishes an inner circumference of the electrode assembly; and
an electrically conductive plate within an inner circumference of the electrode assembly, wherein the electrically conductive late contacts the first electrode tab.

17. The electrode assembly of claim 16, wherein the electrically conductive plate is a shape selected from a rectangle and a circle.

18. The electrode assembly of claim 16, wherein at least one edge of the electrically conductive plate is serrated.

* * * * *

UNITED STATES PATENT AND TRADEMARK OFFICE
CERTIFICATE OF CORRECTION

PATENT NO.        : 8,343,641 B2
APPLICATION NO.   : 12/467037
DATED             : January 1, 2013
INVENTOR(S)       : Sooyeon Maeng et al.

It is certified that error appears in the above-identified patent and that said Letters Patent is hereby corrected as shown below:

In the Claims

Column 10, Claim 16, line 30        Delete "late"
                                    Insert -- plate --

Signed and Sealed this
Fifteenth Day of July, 2014

Michelle K. Lee
*Deputy Director of the United States Patent and Trademark Office*